April 21, 1931.  C. J. HALBORG  1,802,053
BROACHING EQUIPMENT
Filed Sept. 6, 1928  2 Sheets-Sheet 2
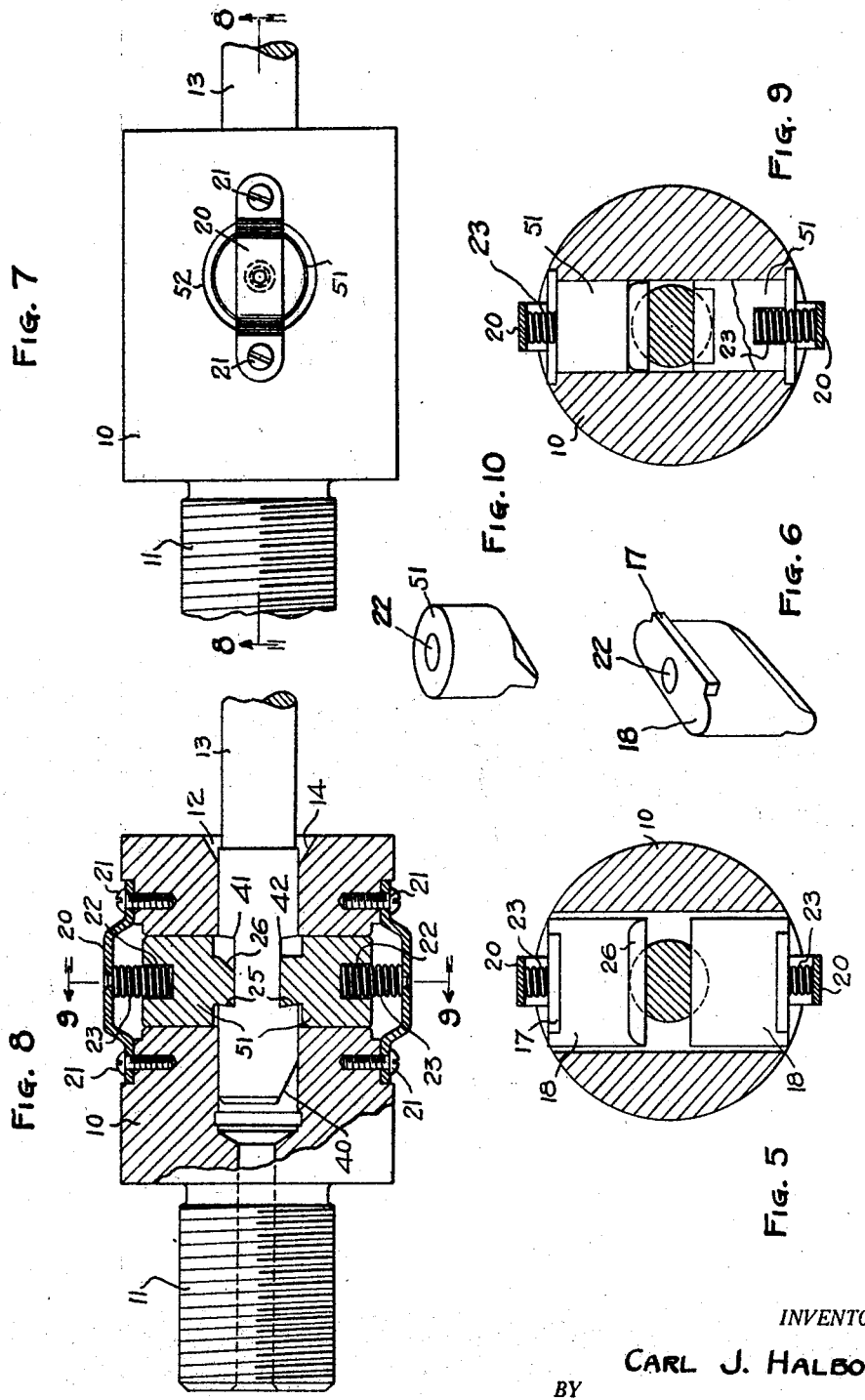
INVENTOR.
CARL J. HALBORG
BY
Harness, Dickey & Pierce
ATTORNEY.

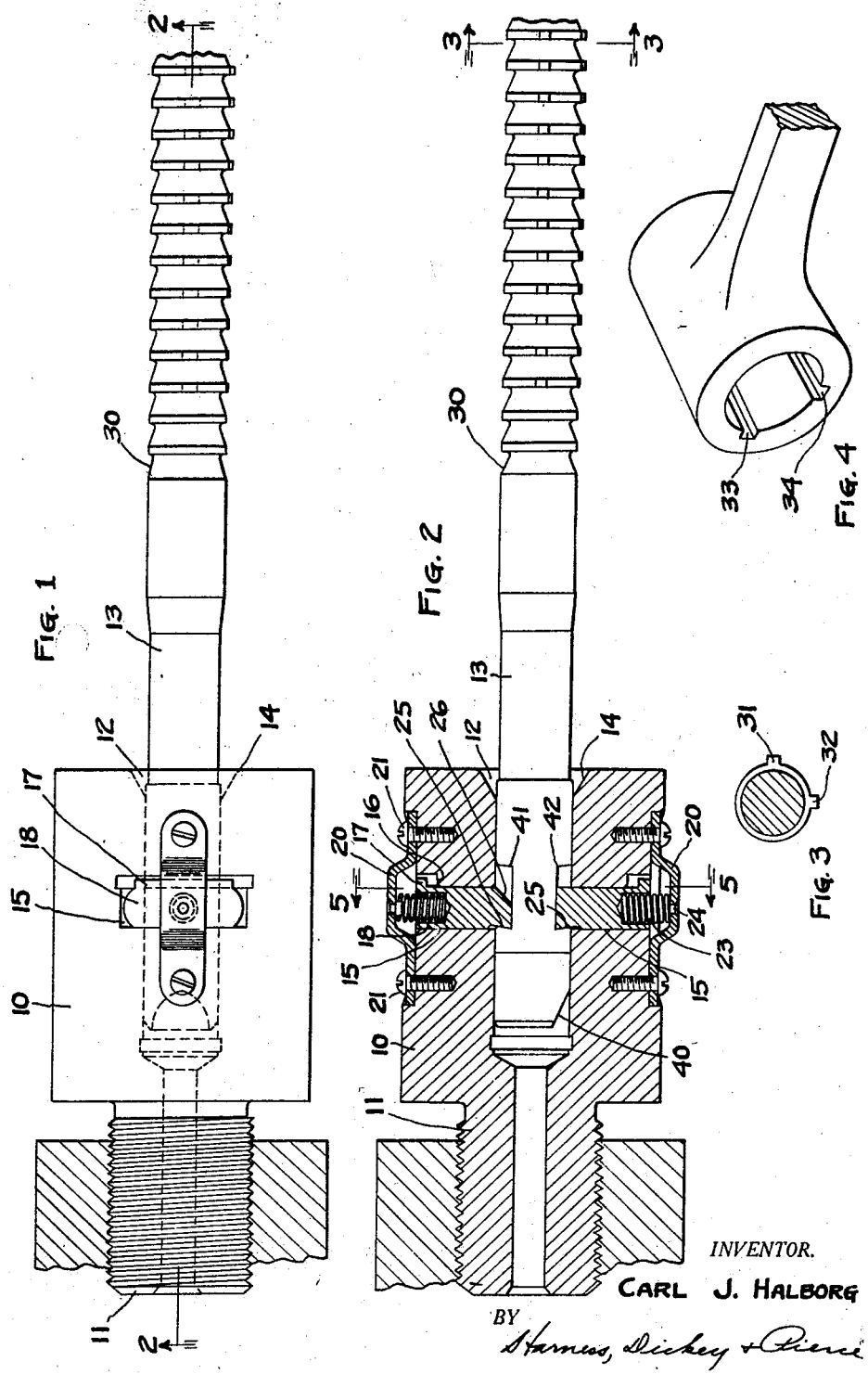

Patented Apr. 21, 1931

1,802,053

UNITED STATES PATENT OFFICE

CARL J. HALBORG, OF DETROIT, MICHIGAN, ASSIGNOR TO COLONIAL TOOL COMPANY, A CORPORATION OF MICHIGAN

BROACHING EQUIPMENT

Application filed September 6, 1928. Serial No. 304,210.

The principal object of my invention is to provide a broach and broach holder which may be very quickly and simply engaged and disengaged and in which it will be impossible to insert a broach which has unequally spaced longitudinal rows, or rows of differently dimensioned cutter teeth in the holder in the wrong position.

With this and other objects in view my invention consists in the arrangement, combination and construction of the various parts of my improved device as described in the specification, claimed in my claims, and shown in the accompanying drawings in which,—

Fig. 1 is a plan view of a broach holder and broach embodying my invention.

Fig. 2 is a view taken on the line 2—2 of Fig. 1.

Fig. 3 is a view taken on the line 3—3 of Fig. 2.

Fig. 4 is a perspective of a crank arm and its hub having non-uniformly spaced keyways cut therein.

Fig. 5 is a view taken on the line 5—5 of Fig. 2.

Fig. 6 is a perspective of one form of retaining plug used in my broach holder.

Fig. 7 is a plan view of a modified form of broach holder and a broach shank embodying my invention.

Fig. 8 is a view taken on the line 8—8 of Fig. 7.

Fig. 9 is a view taken on the line 9—9 of Fig. 8.

Fig. 10 is a perspective of a modified form of retaining plug utilized in the broach holder shown in Figs. 7, 8 and 9.

I have shown a broach holder 10 having a power engaging shaft 11 and having a socket 12 positioned centrally therein. The main portion of this socket 12 is of a size to freely but closely fit a broach shank 13. The outer end of the socket is tapered outwardly as at 14 to permit easy location. The broach holder 10 is provided with oppositely disposed transverse openings 15 which lead into the socket 12. These transverse openings 15 may be either rectangular, oval, circular, or any form desired. It has been found, however, that a circular opening 52 such as shown in Figs. 7, 8 and 9 is more easily and accurately made than any of the other forms and I prefer it in most cases. The openings 15 at their outer ends are formed with countersunk shoulders 16 along one side as shown in Figs. 1 and 2, or, if desired, around the entire openings, which are adapted to engage lateral flanges 17 formed on the outer ends of the plugs 18 and to prevent the plugs from sliding too far inwardly in the passages 15 when the broach shank is removed from the socket 12. The holders 10 are also counterbored for a considerable space around the outer ends of the passages 15, and the ends of spring retaining clips 20 are fastened therein by screws 21. The plugs 18 and 51 have sockets 22 formed in their outer ends in which coil springs 23 are adapted to fit. The outer ends of the coil springs 23 bear against retaining studs 24 in the spring clips 20. The springs 23 are tensioned to normally force the plugs 18 and 51 toward the socket 12. The inner ends of the plugs 18 and 51 have their rear faces diagonally cut as shown at 25 and the upper plug in each case, Figs. 2 and 8, has its forward face diagonally cut as at 26 while the lower plug, Figs. 2 and 8, is left with its forward face perpendicular relative to the socket 12.

The broach 30 is formed with non-uniformly spaced longitudinal rows 31 and 32 of cutting teeth (Fig. 3) and in cutting keyways 33 and 34 shown in the crank hub, Fig. 4, it is necessary that the broach be re-inserted in the broach holder, after making a cut, with its teeth in the same relative position as they were when the preceding cut was made, this owing to the position in which work pieces such as the crank hub, shown in Fig. 4, are positioned for cutting in the machine. In order to insure the broach being re-inserted in the broach holder with its teeth always in the same position relative to the work upon which the operations are being performed, I have formed a taper or cut-away portion 40 on one side of the end of the shank 13 and have left the remainder of the end untapered. I have also provided parallel transverse slots 41 and 42 in the intermediate portion of the shank 13, the slot 42 being on the same side of the shank as the taper 40. The inner side walls of the slots 41 and 42 are diagonally cut to fit the diagonal faces 25 of the plugs 18 and 51, and outward pull upon the broach 30 and shank 13 merely tends to draw the plugs and slot walls into deeper engagement and to eliminate any possibility of wear which would permit the edges of the plugs to slip outwardly on the walls of the slots due to pulling strain. By forming the taper 40 on one side of the end of the shank 13 relative to the position of the rows of cutting teeth 31 and 32 and by providing the taper 26 on the forward face of the upper plugs, 18 and 51, it is possible for the shank to be inserted in the holder in one position only and that is the position which will bring the taper 40 on the shank 13 against the vertical face of the lower plug 18 or 51, and which will bring the taper 26 on the upper plug 18 or 51 against the blunt portion of the end of the shank 13 and thereby permit the broach shank to force the plugs outwardly and so allow the end of the shank to proceed into the end of the socket 12 and bring the slots 41 and 42 in alignment with the plugs 18 and 51. Thus, if the broach is turned out of position by the machine operator when he attempts to replace it in the holder he will not be able to insert it until it has been returned to the correct position relative to the work piece. This insures the correct operation of the broach and eliminates the possibility of much waste which might be caused by pulling the broach in the wrong position.

The embodiment shown in Figs. 7, 8, 9 and 10 are the same as that shown in Figs. 1, 2 and 3 with the exception that round plugs 51 and transverse openings 52 are provided instead of the oval shape shown in the first figures.

Formal changes may be made in the specific embodiment of the invention described without departing from the spirit or substance of the broad invention, the scope of which is commensurate with the appended claims.

What I claim is:

1. In combination, a broach and a puller therefor, said broach having a shank with transverse slots in the opposite sides thereof and having a taper formed on one side only of its end to the rear of one of said slots, and having the opposite side of its end substantially untapered, said puller having a central socket therein and having transverse openings leading to opposite sides of said socket, a pair of plugs in said transverse openings adapted to engage the slots in said broach shank, and one of said plugs having its forward face tapered for cooperation with the untapered end of said broach shank, and the other plug having its forward face substantially untapered and adapted to co-operate with the tapered end of said broach shank, whereby said shank may be inserted in said puller in only one position.

2. In combination, a broach and a puller therefor, said broach having a shank with transverse slots in the opposite sides thereof and having the rear walls of said slots forwardly inclined, and having a taper formed on one side of its end to the rear of one of said slots, and having the opposite side of said end substantially untapered, said puller having a central socket therein and having transverse openings leading to opposite sides of said socket, a pair of plugs in said transverse openings having the rear faces of their inner ends cut and tapered to fit the inclined wall of the slots in said shank, and one of said plugs having its forward face tapered for cooperation with the untapered end of said broach shank, and the other plug having its forward face substantially untapered for co-operation with the tapered end of said broach shank, whereby said shank may be inserted in said puller in only one position.

3. A broach having a shank provided with opposed notches in the side walls thereof and spaced from the free end thereof for the reception of locking members, and having one side of the free end of said shank beveled in longitudinal alignment with one of said notches and having the opposite side of said free end substantially perpendicular to the axis of said shank.

CARL J. HALBORG.